United States Patent
Nguyen et al.

(10) Patent No.: US 7,492,715 B2
(45) Date of Patent: Feb. 17, 2009

(54) APPARATUS AND METHOD FOR REAL-TIME OVERLOAD CONTROL IN A DISTRIBUTED CALL-PROCESSING ENVIRONMENT

(75) Inventors: Nhut Nguyen, Richardson, TX (US); Matt M. Wu, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 809 days.

(21) Appl. No.: 10/882,732

(22) Filed: Jun. 30, 2004

(65) Prior Publication Data

US 2005/0190748 A1 Sep. 1, 2005

Related U.S. Application Data

(60) Provisional application No. 60/548,455, filed on Feb. 27, 2004.

(51) Int. Cl.
*H04L 12/26* (2006.01)
(52) U.S. Cl. .................. 370/235; 370/237; 370/352; 379/133; 709/223
(58) Field of Classification Search .......... 370/235, 370/237, 352; 379/133; 709/223
See application file for complete search history.

(56) References Cited

U.S. PATENT DOCUMENTS

| | | | | |
|---|---|---|---|---|
| 4,974,256 A | * | 11/1990 | Cyr et al. | 379/112.04 |
| 5,513,255 A | * | 4/1996 | Yoo et al. | 379/133 |
| 5,513,257 A | * | 4/1996 | Yoo et al. | 379/221.03 |
| 5,924,026 A | * | 7/1999 | Krishnan | 455/414.1 |
| 5,943,232 A | * | 8/1999 | Gehi et al. | 700/79 |
| 6,192,250 B1 | * | 2/2001 | Buskens et al. | 455/463 |
| 6,898,278 B1 | * | 5/2005 | Li et al. | 379/325 |
| 6,977,899 B1 | * | 12/2005 | Matragi et al. | 370/237 |
| 6,981,035 B1 | * | 12/2005 | Goldberg et al. | 709/223 |
| 2002/0156900 A1 | * | 10/2002 | Marquette et al. | 709/227 |
| 2003/0037093 A1 | * | 2/2003 | Bhat et al. | 709/105 |
| 2003/0074473 A1 | * | 4/2003 | Pham et al. | 709/246 |
| 2005/0111367 A1 | * | 5/2005 | Chao et al. | 370/235 |
| 2005/0114429 A1 | * | 5/2005 | Caccavale | 709/200 |
| 2005/0190748 A1 | * | 9/2005 | Nguyen et al. | 370/352 |
| 2006/0018304 A1 | * | 1/2006 | Nguyen et al. | 370/352 |

* cited by examiner

*Primary Examiner*—Ricky Ngo
*Assistant Examiner*—Luat Phung

(57) ABSTRACT

A telecommunication node controls overload conditions in a distributed processing environment using processing nodes that include: (i) a load monitor configured to monitor a loading factor for the processing node and produce real-time loading factor information; and (ii) a call processor operable to process signaling messages. In addition, the telecommunication node uses signaling nodes that include: (i) a load information list including the real-time loading factor information received from each of the processing nodes; (ii) an overload policy list including programmable overload reaction policies for each of the processing nodes, in which the overload reaction policies control overload conditions of the processing nodes based on the real-time loading factor information; and (iii) a load distributor configured to select one of the processing nodes to process one of the signaling messages based on the real-time loading factor information and the overload reaction policies.

24 Claims, 5 Drawing Sheets

APPARATUS AND METHOD FOR REAL-TIME OVERLOAD CONTROL IN A DISTRIBUTED CALL-PROCESSING ENVIRONMENT

CROSS-REFERENCE TO RELATED APPLICATION AND CLAIM OF PRIORITY

The present invention is related to that disclosed in U.S. Provisional Patent Application Ser. No. 60/548,455, filed Feb. 27, 2004, entitled "APPARATUS AND METHOD FOR REAL-TIME OVERLOAD CONTROL IN A DISTRIBUTED CALL-PROCESSING ENVIRONMENT". U.S. Provisional Patent Application Ser. No. 60/548,455 is assigned to the assignee of the present application. The subject matter disclosed in U.S. Provisional Patent Application Ser. No. 60/548,455 is hereby incorporated by reference into the present disclosure as if fully set forth herein. The present invention hereby claims priority under 35 U.S.C. §119(e) to U.S. Provisional Patent Application Ser. No. 60/548,455.

TECHNICAL FIELD OF THE INVENTION

The present invention is generally directed to telecommunication networks and, more specifically, to a real-time overload control technique using programmable overload reaction policies in a distributed call-processing environment.

BACKGROUND OF THE INVENTION

In modern telecommunication systems, a call-processing subsystem is responsible for processing call requests received from the network. Call requests are received by the call-processing subsystem via signaling messages. For instance, in a wireless communications network, a voice and/or data call request from a mobile station is sent as an air interface message to a serving base station, which in turn transmits the air interface message to a mobile switching center (MSC) via signaling links connecting the base station to the MSC. The call request is processed in the call-processing subsystem of the MSC.

Traditionally, the call-processing subsystem consumes the largest portion of the processing power of any call processing telecommunication node. For example, such call processing telecommunication nodes include any type of wireline switch, wireless switch (MSC), router or call server. In many cases, no less than 80% of the processing power is dedicated to call processing. In addition, the call-processing subsystem is one of the most important parts of a telecommunication node. Therefore, in order to maintain stability, the call-processing subsystem requires a high level of protection when the system becomes overloaded with call requests.

In order to provide larger capacity and scalability, conventional call-processing subsystems have recently been designed as distributed computing environments in which processing power is provided by multiple processing nodes. A distributed call processing system presents a higher degree of challenge to overload control design because coordination is required between multiple processing nodes. Providing effective, efficient, real-time overload control in distributed processing environments has become an important issue for call-processing subsystem design.

Conventional overload control systems either focus on a single processing node or do not take into account the load factor of other processing nodes. Thus, overload control tends to be exercised on a single processing node in isolation from other processing nodes. As a result, conventional distributed call-processing subsystems tend to react to overload conditions in an inefficient and ineffective manner. For instance, one processing node may shed work while others remain idle.

Furthermore, the reaction to an overload condition by conventional distributed call-processing subsystems tends to be fixed among all processing nodes and for all signaling message types, making it difficult to implement different reaction behaviors to overload conditions during system operation.

Therefore, there is a need in the art for an improved overload control apparatus and method for use in a distributed processing environment.

SUMMARY OF THE INVENTION

The present invention provides an efficient and flexible real-time overload control method in a telecommunication node capable of processing signaling messages in a distributed processing environment. The real-time overload control method uses signaling nodes that are constantly updated with real-time information regarding the loading factors in each of the processing nodes. In addition, the signaling nodes react to overload conditions in each processing node using programmable overload reaction policies for each of the processing nodes. One overload reaction policy may be applied to all processing nodes or each processing node may have its own overload reaction policy. Different overload reaction policies may be applied to different types of signaling messages. The overload reaction policies may be modified during system operation with instructions from the processing nodes or from other system management functions.

To address the above-discussed deficiencies of the prior art, it is a primary object of the present invention to provide, for use in a telecommunication network, a telecommunication node capable of controlling overload conditions in a distributed processing environment. According to an advantageous embodiment of the present invention, the telecommunication node comprises processing nodes for processing call requests that arrive to the telecommunication node via signaling messages and signaling nodes for receiving the signaling messages and providing the signaling messages to the processing nodes. Each of the processing nodes includes: (i) a load monitor configured to monitor a loading factor for the processing node and produce real-time loading factor information; and (ii) a call processor operable to process signaling messages. Each of the signaling nodes includes: (i) a load information list including the real-time loading factor information received from each of the processing nodes; (ii) an overload policy list including programmable overload reaction policies for each of the processing nodes, in which the overload reaction policies control overload conditions of the processing nodes based on the real-time loading factor information; and (iii) a load distributor configured to select one of the processing nodes to process one of the signaling messages based on the real-time loading factor information and the overload reaction policies.

According to one embodiment of the present invention, the programmable overload reaction policies for each of the processing nodes are the same.

According to another embodiment of the present invention, the programmable overload reaction policies for each of the processing nodes differ between at least two of the processing nodes.

According to still another embodiment of the present invention, each processing node further includes an overload policies controller configured to update the programmable overload reaction policies and provide the updated programmable overload reaction policies to the signaling nodes.

According to yet another embodiment of the present invention, the telecommunication node further comprises a management subsystem connected to manage the processing nodes and the signaling nodes. The management subsystem is further configured to be able to update the programmable overload reaction policies for at least one of the processing nodes and provide the updated programmable overload policies to the signaling nodes.

According to a further embodiment of the present invention, the programmable overload reaction policies for one of said processing nodes apply to each type of signaling messages.

According to a still further embodiment of the present invention, the programmable overload reaction policies for one of the processing nodes include a first overload reaction policy for a first type of signaling message and a second overload reaction policy for a second type of signaling message.

According to yet a further embodiment of the present invention, the programmable overload reaction policies for a first one of the processing nodes include a threshold for the real-time loading factor information above which the signaling messages are not sent to the first processing node.

According to an additional embodiment of the present invention, the programmable overload reaction policies for a first one of the processing nodes include a threshold for the real-time loading factor information above which signaling messages of a first type are not sent to the first processing node.

According to a still additional embodiment of the present invention, the real-time loading factor information is appended to a message sent from one of the processing nodes to one of the signaling nodes.

According to yet an additional embodiment of the present invention, the real-time loading factor information is sent from one of the processing nodes to one of the signaling nodes at select time intervals.

According to a further additional embodiment of the present invention, the telecommunication node is a switch, router or a distributed call server.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1-5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged telecommunication network.

Figure 1:
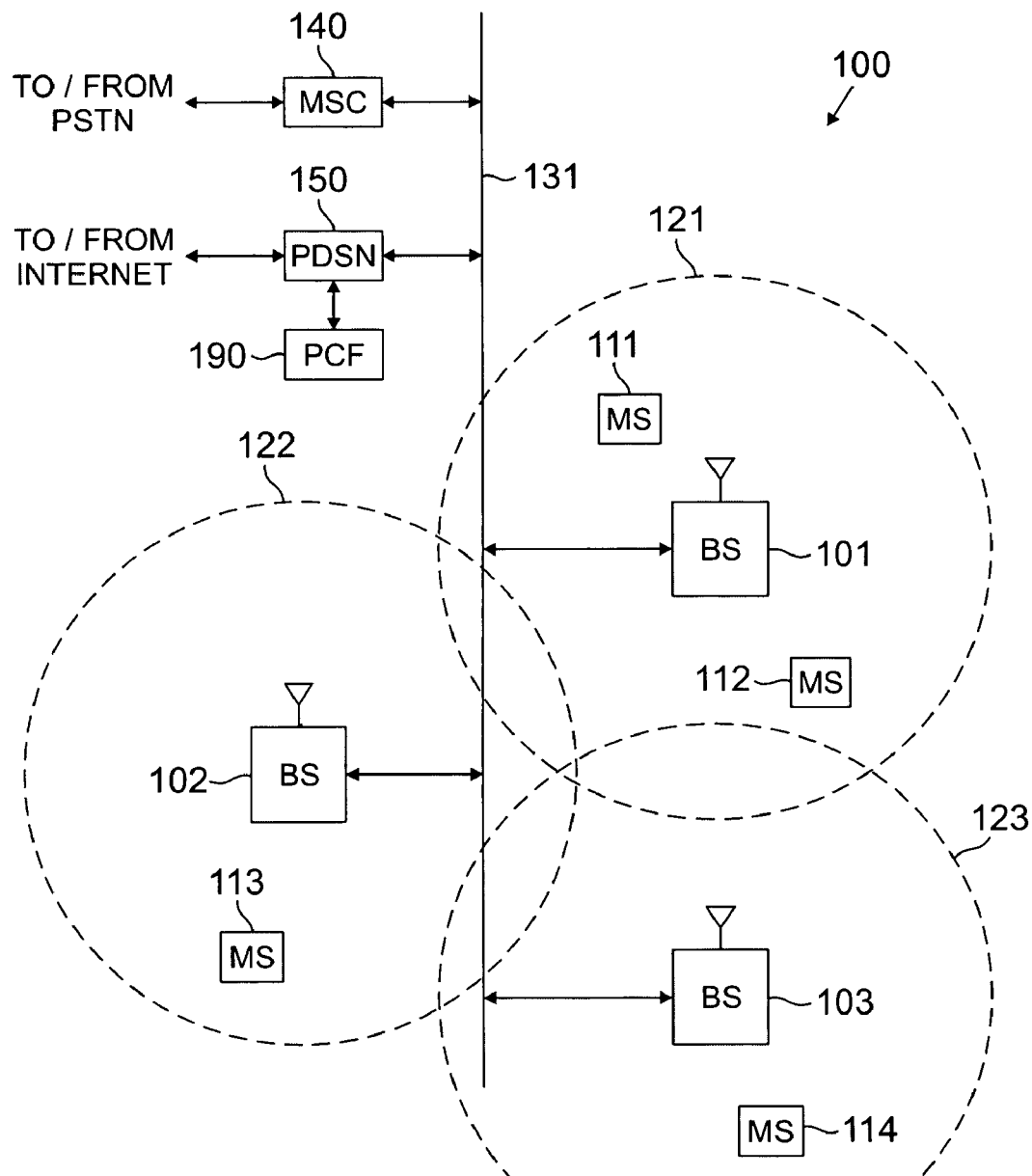
FIG. 1 illustrates an exemplary wireless network in which a telecommunication node can be implemented as a distributed processing environment to provide real-time overload control thereto according to the principles of the present invention.

FIG. 1 illustrates exemplary wireless network 100, in which a telecommunication node can be implemented as a distributed processing environment to provide real-time overload control thereto according to the principles of the present invention.

Wireless network 100 comprises a plurality of cell sites 121-123, each containing one of the base stations, BS 101, BS 102, or BS 103. Base stations 101-103 communicate with a plurality of mobile stations (MS) 111-114 over air interface (wireless) channels. For example, air interface channels may be code division multiple access channels according to the IS-2000-C standard (i.e., Release C of cdma2000) Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1.

MSC 140 is an exchange that performs switching and signaling functions for mobile stations 112, 113 and 114. For example, one of the functions of MSC 140 is to process call requests from mobile stations 112, 113 and 114 and coordinate the setting up of calls to and from mobile stations 112, 113 and 114. Thus, MSC 140 provides services and coordination between the subscribers in a wireless network and external networks, such as the PSTN or Internet. MSC 140 is well known to those skilled in the art.

Line 131 also provides the connection path for control signals transmitted between MSC 140 and BS 101, BS 102 and BS 103 that establish connections for voice and data circuits between MSC 140 and BS 101, BS 102 and BS 103. Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like. In some embodiments of the present invention, communications line 131 may be several different data links where each data link couples one of BS 101, BS 102, or BS 103 to MSC 140.

According to the principles of the present invention, MSC 140 is capable of operating using a distributed call-processing subsystem for processing call requests for mobile stations 112, 113 and 114 and implementing real-time overload control techniques for the distributed call-processing subsystem. Call requests from mobile stations 112, 113 and 114 or from other subscribers destined for mobile stations 112, 113 and 114 received at MSC 140 are processed by one of multiple processing nodes within the distributed call-processing subsystem of MSC 140.

Figure 2:
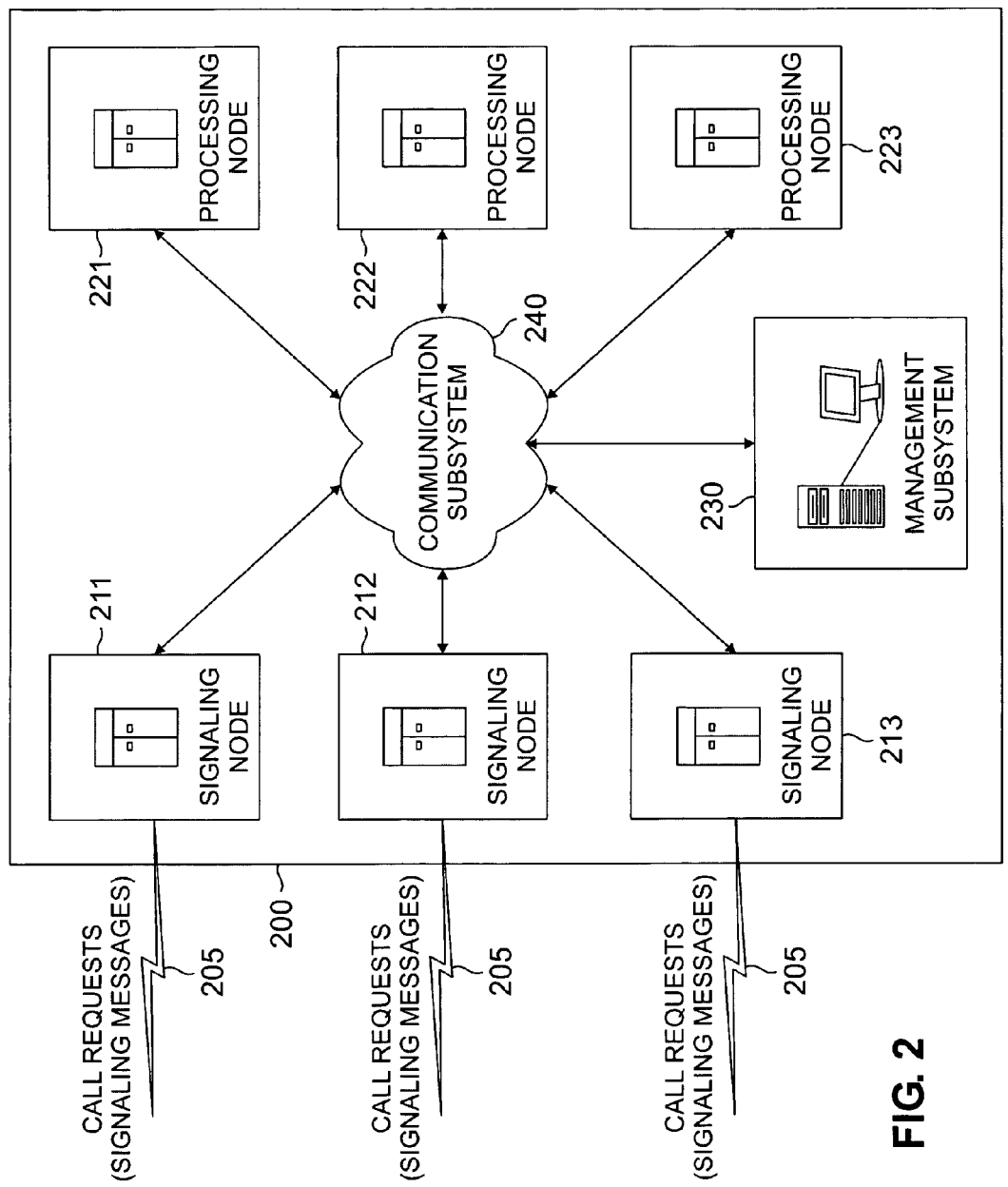
FIG. 2 illustrates an exemplary distributed processing environment within a mobile switching center that implements real-time overload control according to the principles of the present invention.

FIG. 2 illustrates exemplary distributed processing environment 200, which implements real-time overload control techniques according to the principles of the present invention. Distributed processing environment 200 can be implemented in any call processing telecommunication node. For example, such call processing telecommunication nodes include any type of wireline switch, wireless switch (MSC 140), router or call server. Distributed call-processing environment 200 comprises signaling nodes 211-213, processing nodes 221-223, management subsystem 230, and communication subsystem 240. Signaling nodes 211-213 receive signaling messages 205 (e.g., call requests) from external devices (not shown) and route received signaling messages 205 to processing nodes 211-213 via communication subsystem 240. For example, communication subsystem 240 can be an Ethernet system.

Processing nodes 221-223 perform call-processing functions upon receiving signaling messages 205 from signaling nodes 211-213 via communication subsystem 240. Since there are multiple processing nodes, overload control should be exercised in an effective manner such that no single processing node is in an overloaded condition, while other nodes are still below call-processing capacity. In this regard, management subsystem 230 operates to manage signaling nodes 211-213 and processing nodes 221-223 and assist with overload control within distributed processing environment 200, as described in more detail below in connection with FIG. 3.

Figure 3:
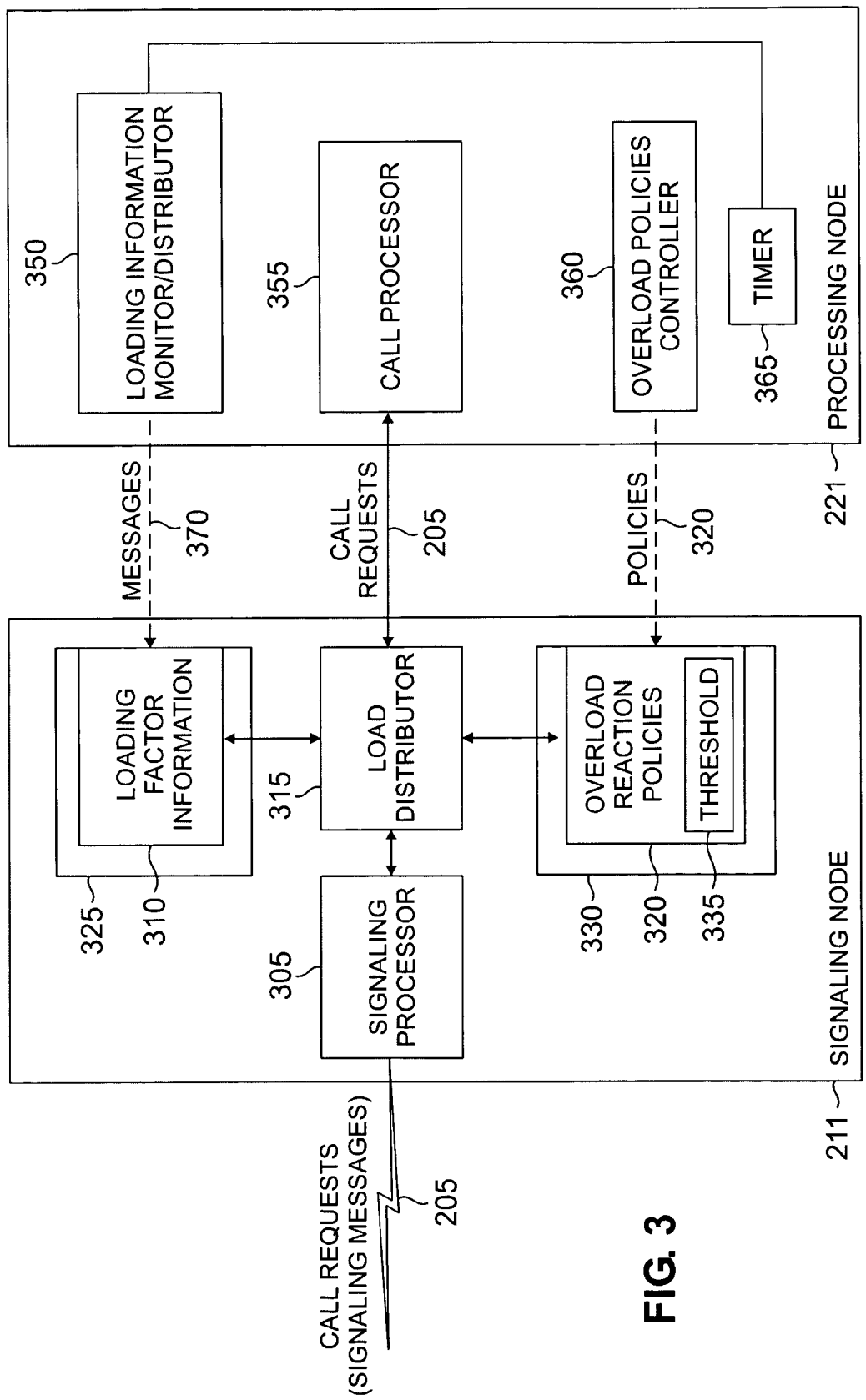
FIG. 3 illustrates an exemplary signaling node and an exemplary processing node of the distributed processing environment in greater detail according to the principles of the present invention.

FIG. 3 illustrates exemplary signaling node 211 and exemplary processing node 221 in greater detail according to the principles of the present invention. Signaling node 211 comprises a plurality of functional blocks, including signal processor 305 and load distributor 315. Signal processor 305 processes incoming signaling messages (call requests) 205 and passes the signaling messages 205 to load distributor 315 to select a respective optimum processing node (e.g., processing node 221, 222 or 223 shown in FIG. 2) for processing each signaling message 205.

Signaling node 211 also comprises lists 325 and 330 accessed by load distributor 315 to determine the optimum processing node 221 for a particular signaling message 205. Loading factor list 325 contains loading factor information 310 for each processing node (e.g., processing nodes 221-223 shown in FIG. 2) within the distributed processing environment. Loading factor information 310 is dynamically updated in real-time by each of the processing nodes 221-223. Thus, each signaling node (e.g., signaling nodes 211-213 shown in FIG. 2) within the distributed processing environment maintains the current loading factor information 310 for each processing node 221-223 within the distributed processing environment.

Overload policies list 330 contains overload reaction policies 320 controlling overload conditions of processing nodes 221-223 based on the real-time loading factor information 310 for each processing node 221-223. For example, overload reaction policies 320 include information related to the overload reaction behavior of each signaling node 211-213 as expected from processing nodes 221-223. The reaction behavior may be the same for all processing nodes 221-223 or may be specific to a particular processing node (e.g., processing node 221).

In addition, the overload reaction policies 320 may be specific to a certain type of signaling messages. For instance, the reaction behavior when receiving a call originating signaling message might be different than the reaction behavior when receiving a signaling message for a call already in progress. Overload reaction policies 320 are programmable, and may be changed dynamically by processing nodes 221-223 or by management subsystem 230, as shown in FIG. 2.

According to one embodiment of the present invention, overload reaction policies 320 include one or more thresholds 335 for real-time loading factor information 310. For example, overload reaction policies 320 for processing node 221 may include a threshold 335 above which signaling messages are not sent to processing node 221. Thus, when the loading factor information 310 for processing node 221 exceeds threshold 335, load distributor 315 does not send any signaling messages 205 to processing node 221. As another example, overload reaction policies 320 for processing node 221 may include a threshold 335 above which only particular type(s) of signaling messages are either sent or not sent to processing node 221.

Load distributor 315 regulates the flow of signaling messages 205 to processing nodes 221-223. Load distributor 315 utilizes loading factor list 325 and overload policies list 330 to route signaling messages 205 to processing nodes 221-223. Load distributor 315 uses information in overload policies list 330 to determine how to react to various overload conditions in the system and how to distribute signaling messages 205 to processing nodes 221-223.

For instance, overload reaction policies 320 for processing node 221 may be programmed in such a way that when processing node 221 is on the verge of becoming overloaded, only certain types of messages may be sent to processing node 221. Thus, upon receiving signaling message 205, load distributor 315 accesses loading factor information 310 and compares loading factor information 310 to overload reaction policies 320 for processing node 221 to determine whether signaling message 205 can be sent to processing node 221. It should be understood that overload reaction policies 320 may be associated only with processing node 221 or with multiple processing nodes.

Load distributor 315 may also access other loading factor information (not shown) in loading factor list 325 associated with a particular processing node (e.g., processing node 222 or 223, shown in FIG. 2) and compare it with other overload reaction policies (not shown) in overload policies list 330 associated with either the particular processing node or multiple processing nodes to determine which processing node to route the signaling message 205 to.

Processing node 221 comprises a plurality of functional blocks, including loading information monitor/distributor 350, call processing subsystem 355, overload policies controller 360, and timer 365. Loading information monitor/distributor 350 in each processing node 221 constantly measures the loading factors of processing node 221 and produces loading factor information 310 related to the loading factors. For example, loading factor information 310 may include capacity information indicating the percentage of processing power currently in use or currently available. As another example, loading factor information 310 may include the number of call requests the processing node 221 is currently processing.

Loading information monitor/distributor 350 sends loading factor information 310 to signaling node 211 whenever a message is sent to signaling node 211. Loading information monitor/distributor 350 also implements an autonomous loading factor distributing function that operates using timer 365. Timer 365 is initialized upon sending a message to signaling node 211. Upon the expiration of timer 365, if processing node 221 has not sent any messages to signaling node 211, loading information monitor-distributor 350 autonomously sends a message including loading factor information 310 to signaling node 211. A separate timer 365 is initialized for each signaling node 211-213 to ensure all signaling nodes 211-213 are updated with real-time loading factor information 310 at regular time intervals.

Overload policies controller 360 is capable of dynamically generating new overload reaction policies 320 and sending the new policies 320 to signaling node 211. Therefore, overload policies list 330 in signaling node 211 is kept current at all times. Call processor 355 receives signaling messages (call requests) 205 from signaling node 211 and processes signaling messages 205.

Figure 4:
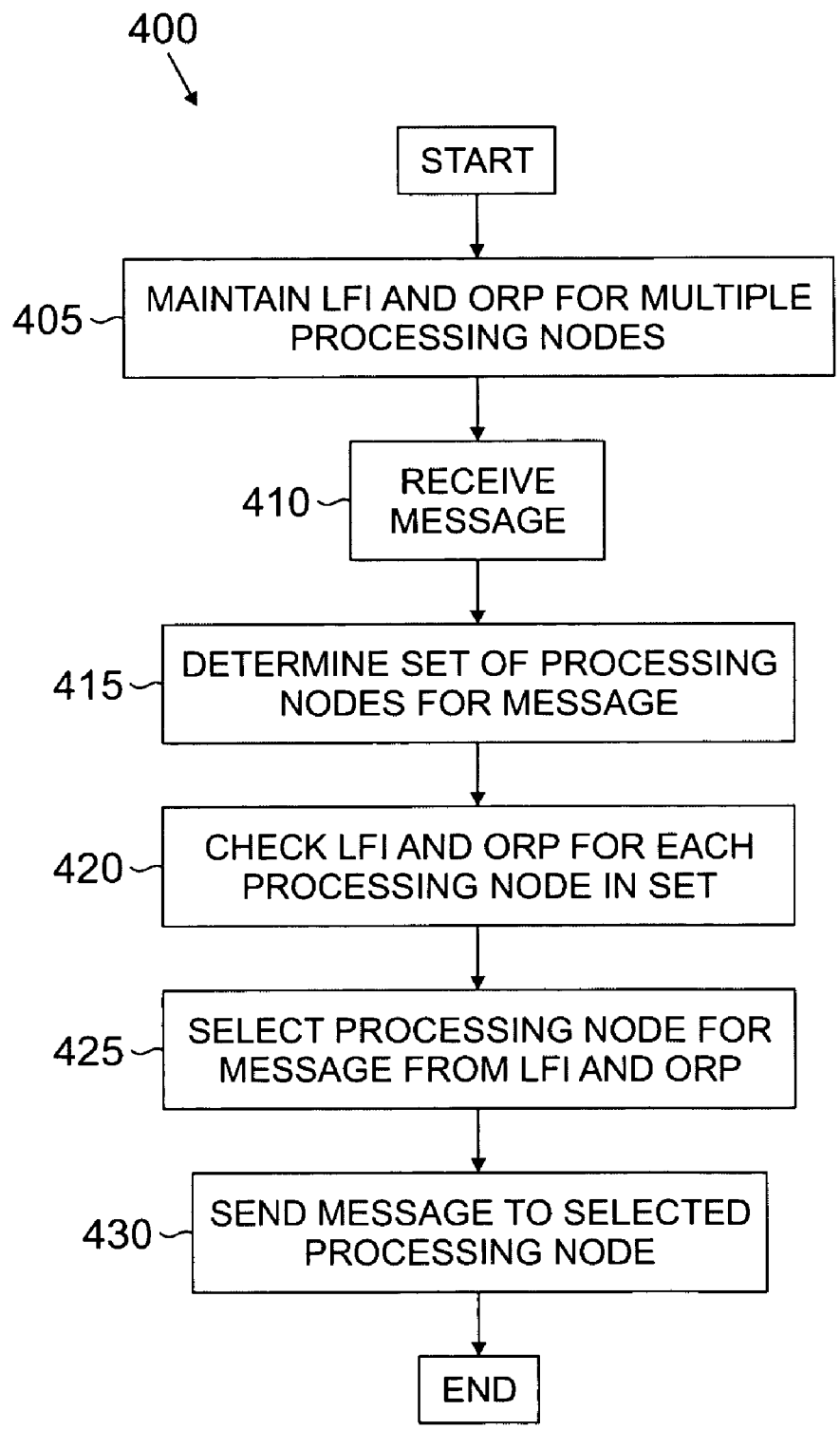
FIG. 4 is a flow diagram illustrating the operation of controlling overload conditions in processing nodes within a distributed call-processing environment according to the principles of the present invention.

FIG. 4 depicts flow diagram 400, which illustrates the operation of controlling overload conditions in processing nodes within a distributed call-processing environment according to the principles of the present invention. Initially, signaling node 211 maintains real-time loading factor information 310 in loading factor list 325 and overload reaction policies 320 in overload policies list 330 for each processing node 221-223 (process step 405). At some point, a call request (signaling message) 205 arrives at signaling node 211 (process step 410). After being processed by signal processing function 305, the call request is forwarded to load distributor 315, which determines a set of processing nodes that can handle the signaling message 205 (process step 415).

Load distributor 315 then checks the loading factor information 310 and overload reaction policies 320 for each processing node within the set of processing nodes (process step 420) to select the optimum processing node (e.g., processing node 221) for the signaling message 205 (process step 425). The signaling message 205 is then sent to the selected processing node 221 where the call is processed (process step 430).

Figure 5:
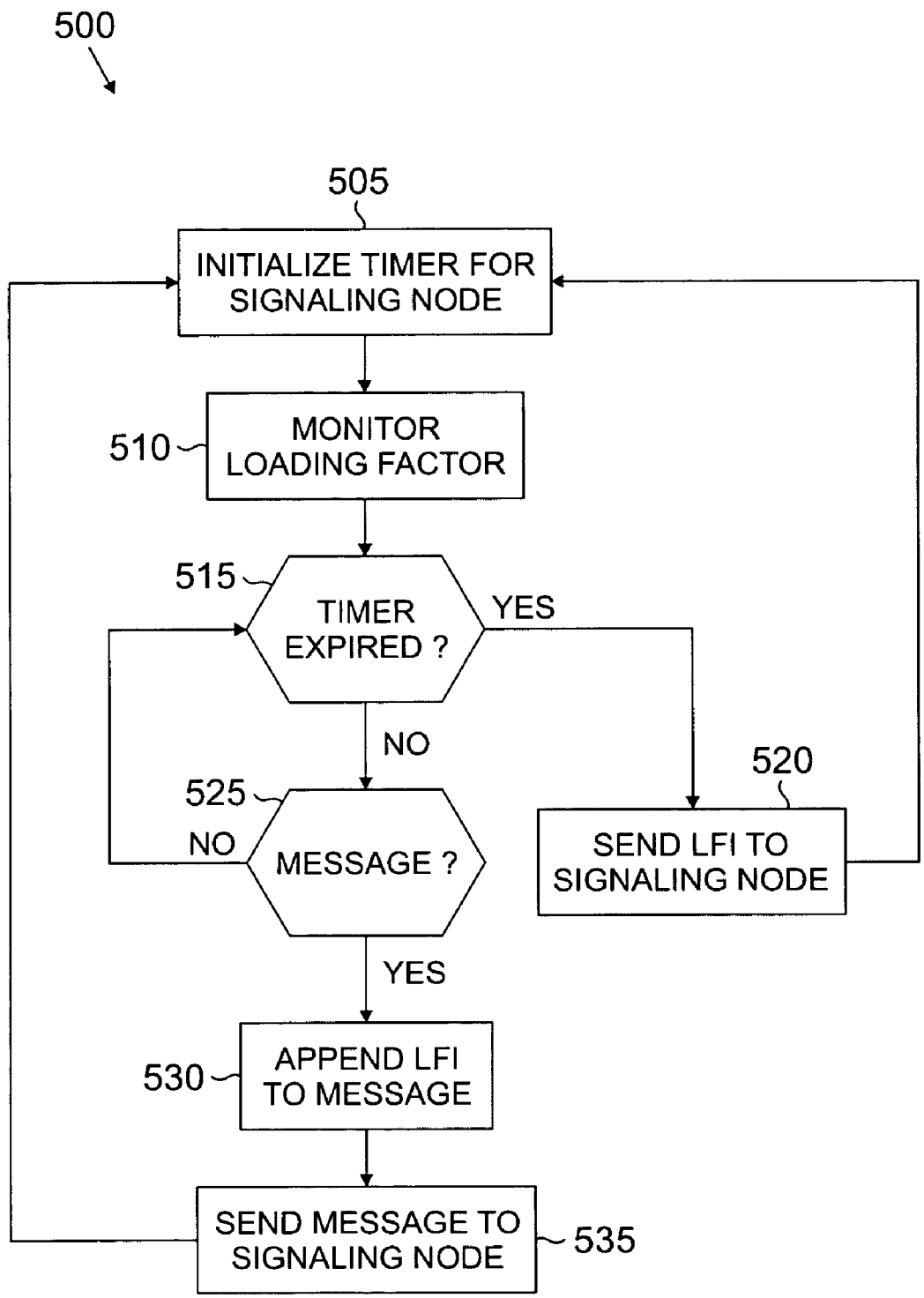
FIG. 5 is a flow diagram illustrating the operation of a processing node to provide real-time loading factor information for use by a signaling node in controlling overload conditions of the processing node according to the principles of the present invention.

FIG. 5 depicts flow diagram 500, which illustrates the operation of a processing node (e.g., processing node 221) to provide real-time loading factor information for use by a signaling node (e.g., signaling node 211) in controlling overload conditions of the processing node 221 according to the principles of the present invention. Initially, processing node 221 initializes a timer 365 for signaling node 211 (process step 505). Processing node 221 constantly monitors (measures) the loading factors of processing node 221 and produces real-time loading factor information from the measured loading factors (process step 510).

If the timer 365 has expired (yes branch of decision step 515), processing node autonomously sends a message with the current loading factor information to signaling node 211 (process step 520). If the timer 365 has not expired (no branch of decision step 515) and a message is being sent from processing node 221 to signaling node 211 (yes branch of decision step 525,) processing node 221 appends the current loading factor information to the message (process step 530) and sends the message to signaling node 211 (process step 535). Upon sending the loading factor information to signaling node 211 (either process step 520 or process step 535), processing node 221 reinitializes the timer 365 (process step 505).

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a telecommunication network, a telecommunication node configured to control overload conditions in a distributed processing environment, said telecommunication node comprising:
   processing nodes, each said processing node including:
   a load monitor configured to monitor a loading factor for said respective processing node and produce real-time loading factor information, and
   a call processor configured to process signaling messages; and
   signaling nodes connected to receive said real-time loading factor information from each of said processing nodes, said signaling nodes further connected to receive said signaling messages and provide said signaling messages to said processing nodes, each said signaling node including:
   a load information list including said real-time loading factor information for each of said processing nodes,
   an overload policy list including programmable overload reaction policies for each of said processing nodes, said overload reaction policies controlling overload conditions of said processing nodes based on said real-time loading factor information, and
   a load distributor configured to select one of said processing nodes to process one of said signaling messages based on said real-time loading factor information for each of said processing nodes and said overload reaction policies for each of said processing nodes, wherein each said processing node further includes an overload policies controller configured to update said programmable overload reaction policies and provide said updated programmable overload reaction policies to said signaling nodes.

2. The telecommunication node as set forth in claim 1 wherein said load monitor for each of said processing nodes is further configured to produce updated real-time loading factor information based on a current loading factor and provide said updated real-time loading factor information to said signaling nodes.

3. The telecommunication node as set forth in claim 1 wherein said programmable overload reaction policies for each of said processing nodes are the same.

4. The telecommunication node as set forth in claim 1 wherein said programmable overload reaction policies for each of said processing nodes differ between at least two of said processing nodes.

5. The telecommunication node as set forth in claim 1 further comprising a management subsystem connected to manage said processing nodes and said signaling nodes, wherein said management subsystem is configured to update said programmable overload reaction policies for at least one of said processing nodes and provide said updated programmable overload policies to said signaling nodes.

6. The telecommunication node as set forth in claim 1 wherein said programmable overload reaction policies for one of said processing nodes apply to each type of said signaling messages.

7. The telecommunication node as set forth in claim 1 wherein said programmable overload reaction policies for one of said processing nodes include a first overload reaction policy for a first type of said signaling messages and a second overload reaction policy for a second type of said signaling messages.

8. The telecommunication node as set forth in claim 1 wherein said programmable overload reaction policies for a first one of said processing nodes include a threshold for said real-time loading factor information above which said signaling messages are not sent to said first processing node.

9. The telecommunication node as set forth in claim 1 wherein said programmable overload reaction policies for a first one of said processing nodes include a threshold for said real-time loading factor information above which said signaling messages of a first type are not sent to said first processing node.

10. The telecommunication node as set forth in claim 1 wherein said real-time loading factor information is appended to a message sent from one of said processing nodes to one of said signaling nodes.

11. The telecommunication node as set forth in claim 1 wherein said real-time loading factor information is sent from one of said processing nodes to one of said signaling nodes at select time intervals.

12. The telecommunication node as set forth in claim 1 wherein said telecommunication node is a switch, router or a distributed call server.

13. For use in a telecommunication node configured to process signaling messages in a distributed processing environment, the telecommunication node including multiple signaling nodes for receiving said signaling messages and multiple processing nodes for processing said signaling messages, a method of controlling overload conditions in said telecommunication node, the method comprising the steps of:
in each processing node:
processing signaling messages received from said signaling nodes,
monitoring a loading factor in said processing node to produce real-time loading factor information,
updating programmable overload reaction policy policies, and
providing said updated programmable overload reaction policies to said signaling nodes; and
in each signaling node:
receiving said real-time loading factor information from each of said processing nodes;
maintaining a load information list including said real-time loading factor information for each of said processing nodes;
maintaining an overload policy list including programmable overload reaction policies for each of said processing nodes, said overload reaction policies controlling overload conditions of said processing nodes based on said real-time loading factor information;
receiving a signaling message; and
selecting one of said processing nodes to process said signaling message based on said real-time loading factor information for each of said processing nodes and said overload reaction policies for each of said processing nodes.

14. The method of claim 13, further comprising:
in each processing node, producing updated real-time loading factor information based on a current loading factor and providing said updated real-time loading factor information to said signaling nodes.

15. The method of claim 13, wherein said programmable overload reaction policies for each of said processing nodes are the same.

16. The method of claim 13, wherein said programmable overload reaction policies for each of said processing nodes differ between at least two of said processing nodes.

17. The method of claim 13, further comprising, in a management subsystem, updating said programmable overload reaction policies for at least one of said processing nodes and providing said updated programmable overload policies to said signaling nodes.

18. The method of claim 13, wherein said programmable overload reaction policies for one of said processing nodes apply to each type of said signaling messages.

19. The method of claim 13, wherein said programmable overload reaction policies for one of said processing nodes include a first overload reaction policy for a first type of said signaling messages and a second overload reaction policy for a second type of said signaling messages.

20. The method of claim 13, wherein said programmable overload reaction policies for a first one of said processing nodes include a threshold for said real-time loading factor information above which said signaling messages are not sent to said first processing node.

21. The method of claim 13, wherein said programmable overload reaction policies for a first one of said processing nodes include a threshold for said real-time loading factor information above which said signaling messages of a first type are not sent to said first processing node.

22. The method of claim 13, further comprising, in one of said processing nodes, appending said real-time loading factor information to a message sent from said processing node to one of said signaling nodes.

23. The method of claim 13, further comprising, in one of said processing nodes, sending said real-time loading factor information from said processing nodes to one of said signaling nodes at select time intervals.

24. The method of claim 13, wherein said telecommunication node is a switch, router or a distributed call server.

* * * * *

UNITED STATES PATENT AND TRADEMARK OFFICE
CERTIFICATE OF CORRECTION

PATENT NO. : 7,492,715 B2
APPLICATION NO. : 10/882732
DATED : February 17, 2009
INVENTOR(S) : Nhut Nguyen and Matt M. Wu It is certified that error appears in the above-identified patent and that said Letters Patent is hereby corrected as shown below:

Column 10, line 1, claim 13, delete "policy" after the term "reaction".

Signed and Sealed this

Sixteenth Day of March, 2010

David J. Kappos
*Director of the United States Patent and Trademark Office*